(12) United States Patent
Kheyraddini-Mousavi et al.

(10) Patent No.: US 10,436,570 B1
(45) Date of Patent: Oct. 8, 2019

(54) HIGH SPEED MICHELSON INTERFEROMETER MICROSCOPE

(71) Applicants: Arash Kheyraddini-Mousavi, Albuquerque, NM (US); Zayd Leseman, Albuquerque, NM (US); Behnam Kheyraddini-Mousavi, Albuquerque, NM (US)

(72) Inventors: Arash Kheyraddini-Mousavi, Albuquerque, NM (US); Zayd Leseman, Albuquerque, NM (US); Behnam Kheyraddini-Mousavi, Albuquerque, NM (US)

(73) Assignee: STC.UNM, Albuquerque, NM (US)

( * ) Notice: Subject to any disclaimer, the term of this patent is extended or adjusted under 35 U.S.C. 154(b) by 0 days.

(21) Appl. No.: 15/330,822

(22) Filed: Nov. 7, 2016

Related U.S. Application Data

(60) Provisional application No. 62/252,074, filed on Nov. 6, 2015.

(51) Int. Cl.
*G01B 9/02* (2006.01)
*G02B 21/08* (2006.01)
*G02B 21/00* (2006.01)
*G02B 27/09* (2006.01)

(52) U.S. Cl.
CPC ..... *G01B 9/02038* (2013.01); *G01B 9/02012* (2013.01); *G01B 9/02041* (2013.01); *G01B 9/02097* (2013.01); *G02B 21/0056* (2013.01); *G02B 21/0084* (2013.01); *G02B 21/082* (2013.01); *G02B 27/0927* (2013.01)

(58) Field of Classification Search
CPC .. G01H 9/00; G01B 9/02012; G01B 9/02014; G01B 9/02041; G01B 9/02097; G02B 21/0056; G02B 21/0084; G02B 27/0927
See application file for complete search history.

(56) References Cited

U.S. PATENT DOCUMENTS

| 4,913,547 | A | * | 4/1990 | Moran | G01B 9/02067 356/489 |
|---|---|---|---|---|---|
| 5,841,030 | A | * | 11/1998 | Honsberg | G01H 9/002 73/579 |
| 6,710,799 | B2 | * | 3/2004 | Abnet | G01B 9/04 348/135 |
| 9,297,702 | B2 | * | 3/2016 | Martin | G01J 9/00 |
| 9,651,477 | B1 | * | 5/2017 | Libbey | G01P 3/36 |
| 2009/0180124 | A1 | * | 7/2009 | Chen | G01H 9/002 356/496 |
| 2017/0299427 | A1 | * | 10/2017 | Nohmi | G01H 9/00 |

* cited by examiner

*Primary Examiner* — Michael A Lyons
(74) *Attorney, Agent, or Firm* — Vogt IP; Keith A. Vogt

(57) ABSTRACT

The present invention provides a Michelson interferometer for capturing images of a vibrating sample comprising a coherent light source. The light source may be adapted to illuminate a sample with a constant brightness across the sample. The interferometer may also be configured to generate a 3D representation of a sample using a single frame for a predetermined phase of the sample. The 3D representations may be combined to create a 3D video representation of the vibrating sample.

7 Claims, 2 Drawing Sheets

HIGH SPEED MICHELSON INTERFEROMETER MICROSCOPE

RELATED APPLICATIONS

This application claims the benefit of U.S. Provisional Application No. 62/252,074, filed Nov. 6, 2015 and herein incorporated by reference.

STATEMENT REGARDING FEDERALLY SPONSORED RESEARCH & DEVELOPMENT

This invention was made with government support under grant no. 1056077 awarded by National Science Foundation. The government has certain rights in the invention.

INCORPORATION BY REFERENCE OF MATERIAL SUBMITTED ON A COMPACT DISC

Not applicable.

BACKGROUND OF THE INVENTION

Interferometry is a technique, which uses patterns (also known as "fringes") obtained by interference of two beams of light (or any other types of waves) to measure out-of-plane shape/deformation of objects. Based on their relative phase, two waves can interfere constructively or destructively. Constructive interference causes an increase in the intensity of the light (white fringes) and destructive interference causes a decrease in the intensity (dark fringes). An interferogram is an image of these interference patterns and it looks as strips of dark and white regions that can span across the image. Interferometry can also be viewed as a method of encoding that encrypts the three-dimensional information on a two-dimensional image. One commercial application of this is in holograms. The image seen when looking at a properly illuminated hologram changes as the position and orientation of the viewing system changes making the image appear three dimensional. The holographic recording itself is not actually an image though. It is made as structures of either varying intensity, density or profile which have no resemblance to the actual image.

Different techniques have evolved from the basic idea of using interference of waves to measure the out-of-plane height. Based on the frequencies of interfering waves being similar or different these methods can be divided into two main classes, i.e. homodyne or heterodyne. Some examples include Fabry Perot, Mach Zehnder, Fizeau and Michelson Interferometers. The method used as an exemplar of the present invention is the latter one.

The basics of operation of a Michelson interferometer are relatively simple. A collimated beam of light is divided into two identical beams, which combine again after reflecting back from the sample and the reference mirror, creating an interferogram at the CCD camera.

In interferometry and holography, the out-of-plane height information are coded as phase difference between the incident waves. Theoretically, there is no height range limit for this method as long as it is less than the coherence length of the light used and within the focal length of the imaging system but phase data obtained with this method are wrapped into $[-\pi,\pi]$ range. This means there is no one-to-one relationship between phase and height which makes decryption (unwrapping) of the phase and getting the height data mathematically challenging and sometimes impossible. It also means that unlike the height information, the phase information stored in the fringes is not continuous but rather in the form of discontinuous strips of information.

BRIEF SUMMARY OF THE INVENTION

In one embodiment, the present invention provides a new operational mode to the Michelson interferometry which has considerable advantages over phase shifting interferometers (PSI) or vertical scanning interferometers (VSI).

In other embodiments, the present invention provides a microscope that not only increases the accuracy over existing designs but broadens the operation of interferometry to highly dynamic experiments.

In other embodiments, the present invention provides a microscope having long distance optics that make it possible to observe experiments done under vacuum as well.

In other embodiments, the present invention uses Fourier phase analysis to provide a stable and robust method for phase analysis of interferograms.

In other embodiments, the present invention provides 3-D phase unwrapping method that are highly effective and efficient for unwrapping the wrapped phase information obtained using interferometry to obtain 3-D height information and sample shape reconstruction in 3-D.

In other aspects, the embodiments of the present invention illuminate the sample with a constant brightness by expanding the light used from a point source to create a planar wave front. This is done by providing light which is diffracted from a pinhole and which is then collimated to a diameter of ~2". A 2" achromatic plano-convex lens may be used for collimation. Expanding the beam to ~2" and then using only the central 0.5" of it, resulted in an almost flat top beam. This led results in almost constant brightness across the image.

In other aspects, the embodiments of the present invention illuminate the sample using a single mode laser to create a homogeneous image of the sample. In yet other embodiments, optical fiber lasers may be used having a narrow bandwidth gap.

In yet other embodiments, the present invention uses a faster shutter speed than the capture rate of the camera to enable the microscope to record transient vibrations at very high frequencies.

In another embodiment, the present invention combines spectroscopy with interferometry.

In another embodiment, the present invention does not require a high speed camera but rather modulates the light source at a speed greater than the target frequency.

In certain embodiments, the present invention increases frequency of the light, from its original value being equal to the frequency of the sample, with a fraction of the frequency of the camera. In a preferred embodiment, increasing the frequency of the light with a value equal to 0.5%-5% of the camera frequency is practical and does not result in blurry fringes.

In one embodiment, the present invention provides a Michelson interferometer comprising a coherent light source, the light source may be adapted to illuminate a sample with a constant brightness across the sample. In other aspects, the light source is comprised of a single mode and the light is collimated wherein the sample is illuminated by a central portion of the collimated light. The sample may also be illuminated by a flat top beam created by the light source.

In another embodiment, the present invention includes a point source wherein light from the light source expands from the point source to create a planar wave.

In yet other aspects, the present invention provides a pinhole or other restricted diameter opening from which light is emitted. In another embodiment, the present invention provides an interferometer which may be configured to use a one-to-one frame capture.

In other embodiments, the interferometer is configured to generate a 3D representation of a sample using a single frame.

In other embodiments, the present invention provides a Michelson interferometer for capturing images of a vibrating sample comprising a coherent light source, the light source may be adapted to illuminate a sample with a constant brightness across the sample and the interferometer is configured to generate a 3D representation of a sample using a single frame for a predetermined phase of the sample. In other aspects, the 3D representations are combined to create a 3D video representation of the vibrating sample.

In other embodiments, the present invention provides an interferometer which may be configured to strobe the light at the same frequency as a vibrating sample to capture the shape of the sample at a predetermined phase in the vibration of the sample. In other aspects, the interferometer may be configured to use a one-to-one frame capture and cover the complete range of vibration of the sample.

In other embodiments, the present invention provides an interferometer which is configured to capture a complete vibration cycle of a sample. For this embodiment, the light may be strobed at a frequency greater than the harmonic frequency of the sample and a plurality of frames are obtained at increasing phases of the sample. In other applications, the frames are obtained at monotonically increasing phases of the sample. In still further embodiments, the light may be strobed at a frequency that is greater than the frequency of the sample by 1/n, wherein n corresponds to the number of frames required to capture a complete vibration cycle of a sample. For this embodiment, n may be in a range of 20-100 or greater than 100.

In other embodiments, the present invention provides a method of using a Michelson interferometer to capture images of a vibrating sample by providing a coherent light source that may be adapted to illuminate a sample with a constant brightness across the sample and the interferometer is configured to generate a 3D representation of a sample using a single frame for a predetermined phase of the sample. In other aspects, the 3D representations are combined to create a 3D video representation of a vibrating sample.

In another embodiment, the method of the present invention strobes the light at the same frequency as the vibrating sample to capture the shape of the sample at a predetermined phase in the vibration. The method may also include the step of using a one-to-one frame capture and to cover the complete range of vibration of the sample by using a plurality of different frames. The method may also be used in other embodiments to capture a complete vibration cycle of a sample. For this embodiment, the light may be strobed at a frequency greater than the harmonic frequency of the sample and a plurality of frames are obtained at increasing phases of the sample. In other embodiments, the light may be strobed at a frequency that is greater than the frequency of the sample by 1/n, wherein n corresponds to the number of frames required to capture a complete vibration cycle of a sample. In addition, a monotonically increasing phase shift may be used between the strobing light and the vibrating sample in order to capture an image of the sample at different phases of the vibration of the sample.

In yet other embodiments, the method includes avoiding the need of stopping a wave train and introducing an uncontrollable phase difference between the strobing and vibration. For this embodiment of the present invention, a method is provided which involves introducing a slight difference between the two frequencies represented by the strobing light and vibrating sample. If the sample is vibrating at 1,000,000 Hz and the light strobes at 1,000,000.001 Hz for every 1,000,000,000 oscillations of the sample the light strobes 1,000,000,001 times. This means that each stobe happens at $$\frac{2\pi}{1,000,000,000}$$

radian phase difference with the other one. If for every 1,000,000 oscilations one frame gets captured, then while the shutter was one the camera has received the light reflection while the light illuminated phase 0 to $$\frac{2\pi}{1000}$$

which since is too small of a phase sweep, doesn't cause any noticeable blurriness in the frame captured. However this also means that there is $$\frac{2\pi}{1000}$$

radians phase different between each frame. Thus the whole 2π vibration of the device can be clearly captured in 1000 frames which when converted to 3D representations can be played one after the other to create a 3D video of the vibration of the device.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain embodiments discussed in the present document.

FIG. 2 also shows that there is a 90-degree phase difference between the laser and the MEMS.

FIG. 3 shows how to image the full vibration mode using only 5 frames.

DETAILED DESCRIPTION OF THE INVENTION

Figure 1:
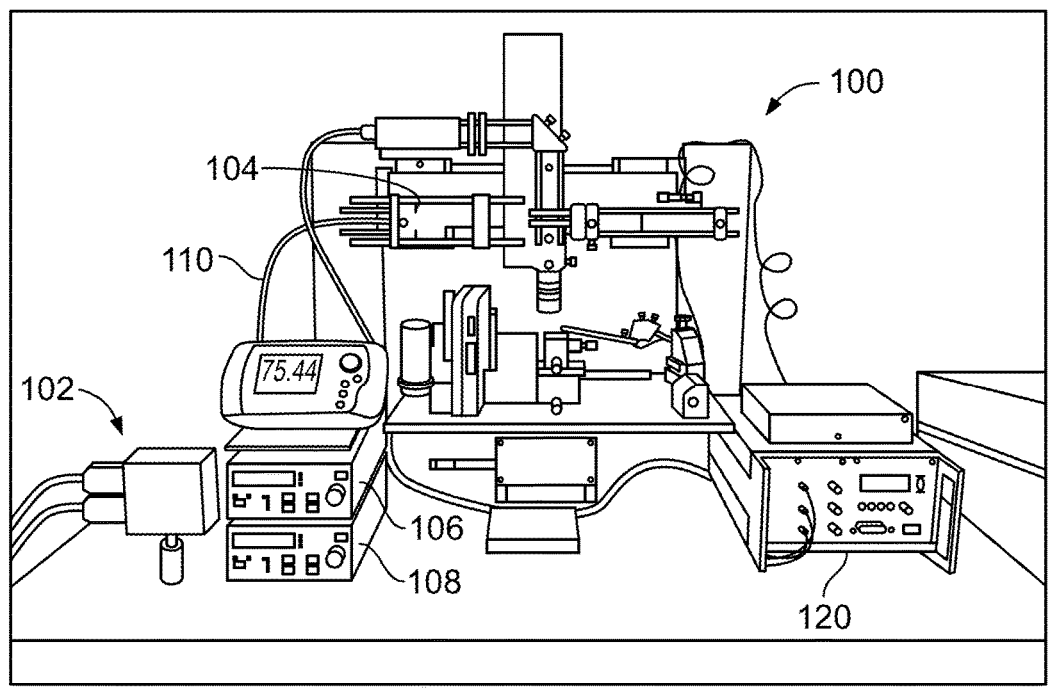
FIG. 1 illustrates an interferometer microscope built in accordance with the teachings of an embodiment present invention.

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed method, structure or system. Further, the terms and phrases used herein are not intended to be limiting, but rather to provide an understandable description of the invention.

The light used for interferometry has deterministic effect in image quality, fringe formation, fringe contrast and height range covered per fringe. Michelson interferometry is highly sensitive to wave front quality and any patterns in the wave front can considerably reduce the image quality and add noise to the image. Other factors decreasing the interferogram contrast are unwanted mechanical vibrations transmitted to the microscope and air density changes due to air flow.

When creating an interferogram, care should be taken when selecting the wavelength of the light to be used. The samples should not be transparent to the wavelength selected. Moreover, in order for the interference patterns to form, light should be coherent, meaning the phase difference between interfering waves should be a function of the path length difference between them. There are two types of coherence associated with light, i.e., temporal and spatial. Temporal coherence is a measure of the longitudinal distance over which phase is conserved. Spatial coherence measures the coherence of light over the beam cross section. For purposes of the present invention, temporal coherence can be considered to control the formation of fringes while spatial coherence controls the contrast in different areas of the image.

Natural light has a temporal coherence length of less than ~5 μm and low spatial coherence. This makes the formation of interference patterns considerably difficult and places a barrier on their contrast. In order to produce interference patterns using natural light, the path length of the interfering beams should be matched with less than ~5 μm accuracy. This also considerably limits the measurable height range of a sample.

The usual temporal coherence lengths for lasers on the other hand, can range from a couple of meters to a couple of kilometers. This makes it easier to obtain interference fringes. In addition, because lasers in general have higher spatial coherence, the fringes will also have considerably higher contrast compared to natural light. The large coherence lengths of lasers also mean that large out-of-plane deformations may be measured.

While it appears that the superior properties of lasers would make them the optimal choice for use with interferometry, the use of lasers presents drawbacks as a result of problems resulting from their longer temporal coherence length. A long coherence length means that the light has a longer "memory" to itself carrying the diffraction effects due to the dust particles and debris on the optics, for a longer distance. This can considerably reduce the quality of the final image. Despite all the effort to keep optics as clean as possible, it is not possible to have absolutely no dust at all. The diffraction of light from the small debris results in concentric circular rings clearly visible in the final image.

Light polarization is another main characteristic of light to be considered when working with lasers. In order for the interference patterns to form, the two incident beams should have similar polarization. Not having the same polarization can reduce or even completely ruin the fringe contrast. In order to prevent any issues related with polarization, it is highly recommended to use polarization nonsensitive optics.

In preferred embodiments of the present invention, a single mode optical fiber may be used. Using a single mode not only has the advantage of providing flexibility in transferring the light produced by the diode to the main structure of the microscope and aligning it properly, but it also removes extra modes present in the light coming off the diode. This eliminates any interference patterns that may exist as a result of interference of existing different modes of light.

FIG. 1 illustrates an interferometer microscope 100 constructed in accordance with the teachings of an embodiment present invention. As shown, interferometer microscope 100 includes a light generation unit 102 and is composed of laser source, temperature controller 106 and current controllers 108 which feed the light into the optical cable 110 and through pinhole 104. A piezo controller 120 may be combined with the signal generation PCI board 122 and composes the actuation unit.

Other components of the device may include a beamsplitter, a reference mirror, two microscope objectives and a CCD-camera. The input light is split into two identical perpendicular beams, which travel along the reference arm and sample arm and reflect back from the reference mirror and the sample. One of the many samples that may be analyzed is a MEMS μcantilever. The reflected beams are added together and interfere before reaching the camera. The two beams reflected from the mirror and the sample, have traveled different distances and have different phase angles. The difference in the phase angles can lead to constructive or destructive addition of the two waves at different points across the beam.

Unlike prior devices which are only capable of analyzing a static sample, the interferometer of the present invention is capable of measuring the three dimensional vibrations or movements of a sample such as a MEMS or photonic crystals whose critical dimensions can be comparable to the diffraction limit of light and their out of plane shape and vibrations amplitudes range from a couple of nanometers to a couple of micrometers.

In theory, the addition of two waves should result in an interferogram with a high contrast but interferograms obtained using prior designs lack the required resolution and contrast. Different image processing techniques have been used to enhance the image to some extent. But in order to an obtain a high resolution and trustable data, the original interferogram is required to have considerable contrast and sharpness.

As is also shown in FIG. 1, a preferred embodiment provides an upright microscope which could be easily used for horizontal samples while providing enough free space underneath for a custom made stage and fixture. A cage system provides a means of creating complicated optical systems with considerable accuracy and mechanical stability. The cage compatible optical components, tip-tilt controls, micro-positioners and so on provide means of accurately and stability aligning the optics.

In accordance with a preferred embodiment of the present invention as shown in FIG. 1, interferometer microscope 100 includes a laser diode equipped with appropriate temperature and current controllers; a collimation unit; a pellicle beam-splitter; a reference arm; an object arm; at least one CCD camera with external triggering and shutter timing control capabilities; and at least one function generator to produce three control signals.

As to the optical components used with the present invention, the components should be adapted to have all the necessary degrees of freedom required to align and position them with high resolution. The components may be equipped with coarse and fine x,y and z micro positioners as well as tip-tilt controls. This makes it possible to position the sample properly and align it with the focal plane of the microscope.

A novel feature of the interferometer of the present invention is the ability to generate very high quality interferograms and obtain all the information required to accurately reconstruct the three-dimensional shape of the sample from it as the object is in motion. This information may, in turn, be processed to make a video or movie of the object. One way this may be done is by extracting phase information using Fourier analysis of the interferogram.

In other aspects, the embodiments of the present invention illuminate the sample with a constant brightness by expanding the light used from a point source to create a planar wave front. This may be done by providing light which is diffracted from pinhole 104 (as shown in FIG. 1) and which is then collimated to a diameter of ~2". A 2" achromatic plano-convex lens may be used for collimation. Expanding the beam to ~2" and then using only a central portion of the beam, such as the central 0.5" of it, resulted in an almost flat top beam. This led to almost constant brightness across the image. The planar beam provides a constant intensity in the field of view. As described above, culminating a single mobile laser from a single point source may be used for this embodiment of the present invention.

In other aspects, a sample arm that may be used in accordance with the embodiments of the present invention, provides a long distance microscope objective that may be obtained from Edmond Optics to focus the light on the sample. The microscope objective is installed in the cage using an x,y micro-positioners stage. A separate custom made x, y, z, $\theta_x$, $\theta_y$ stage makes it possible to bring the sample in focus and move it in all three directions as well as controlling its tip/tilt angles.

In other aspects of the present invention, the reference arm may have an objective similar to that of the sample arm, to focus the light on the reference mirror. The objective may be installed in the cage using a x,y,z stage which not only allowed in plane adjustments but also focusing of the objective. The reference dielectric mirror with λ/4 roughness has tip/tilt as well as x, y control. The tip/tilt control is used to control the number of fringes in the image. Almost no separate fringes should be distinguishable if the mirror is completely perpendicular to the completely flat sample (only a mirror used as the sample).

The reflected light beams are directed to a CCD camera after they interfere. This may be done using a 45-degree mirror. A lens is used to create focus of the image at the CCD. The camera shutter is controllable with a resolution of than $10^{-5}$ seconds and it can capture up to 15 frames per second.

Ghost images are among the main sources of noise in most Michelson interferometers. They introduce unwanted patterns on top of the main fringes. The situation may become very serious when imaging with coherent light, since the ghost beams interfere with each other and with the main beams, causing secondary and tertiary fringes.

Ghost beams result from unwanted internal reflections off of different optical elements. Anti-reflection coatings considerably eliminate ghost beams in most of optical elements but not very successful in prismatic beam-splitters.

The small spacing between prisms of prismatic beam splitters is caused by the adhesives and does not exceed a couple of micrometers. But even this is too big of a gap compared to the nanometer vibration amplitudes to be measured for moving objections.

A pellicle beam-splitter is a thin membrane (a couple of micrometers in thickness), which is semitransparent to some wavelengths. These beam splitters are very fragile but currently present the best solution.

In a preferred embodiment of the present invention, a laser diode may be used which is equipped with appropriate temperature and current controllers. The current controller used can modulate or strobe the diode up to 200 kHz. The mount used for the diode can modulate the laser in the range of 200 kHz-500 MHz using an RF input signal. The signals required to actuate the sample, such as a MEMS device, control the laser and trigger the camera may be generated by Agilent function generators (Agilent 33250A & Agilent 33510B). Since the maximum voltage of the signal generated in the function generator is limited to 20 V peak to peak, an amplifier is used to amplify this signal to be able to actuate the MEMS device. it was observed that in order to induce any noticeable vibrations at low frequencies, a minimum of 50 V pp is required.

Known Michelson interferometers which work in either phase shifting (PSI) or vertical scanning (VSI) modes. Both of these operation modes require a highly accurately controlled mechanical motion of microscope elements, which results in motion of the fringes in the image plane. The series of the images which capture the motion of fringes, are then used to obtain the relative phase information of adjacent pixels. The need for accurately controlled mechanical motion of the reference mirror or the mechanical motion of the sample, as well as the need to capture multiple images instead of using a one-to-one capture mode, limits the applications of phase shifting and vertical scanning interferometers to static and quasi-static situations. For example, PSI and VSI modes are unable to capture images of a moving object since a slight movement of the object or mirror is need to accurately capture the static object by creating multiple reference images that depend upon slight differences in location. If the object itself is moving, there is no ability to obtain multiple reference images since the object will have changed position between the reference images themselves.

The embodiments of the present invention overcome this limitation by providing an interferometer microscope that is neither vertical scanning nor phase shifting. Using a coherent light source combined with the high spatial coherence of a laser overcomes the low contrast issues of conventional interferometers and enabled high quality phase information using only a single interferogram eliminating the need for multiple images required in PSI and VSI methods.

In preferred embodiments, the present invention, may operate both in a static mode, a dynamic mode, or in both modes. Static mode may be used for stationary samples, free of any vibrations. This mode may be used to obtain high quality surface roughness data as well as to detect any initial deformations due to residual stresses. The dynamic mode combines spectroscopy with interferometry and has the ability to capture the shape of movements of the sample. In one application, the embodiments of the present invention have the ability to capture the shape of harmonic vibrations of MEMS, oscillating at high frequencies up to 3 MHz and greater. The operation mode is detected automatically based on the external trigger received by the camera. The dynamic operation capability is achieved by two embodiments of the present invention.

In one embodiment, the present invention may be configured to capture transient vibrations of samples vibrating at low frequencies. In a preferred embodiment, the CCD Camera used may be configured to capture up to 15 frames per second but the camera shutter can be controlled as short as 10 μsec. Considering the limitations of the current hardware this mode of operation can currently capture transient vibrations up to 15 Hz and harmonic vibrations up to 10 kHz. Using a faster shutter speed than the capture rate of the camera enables the microscope to record transient vibrations at very high frequencies. Software may be used to run the microscope and camera and use it.

Figure 2:
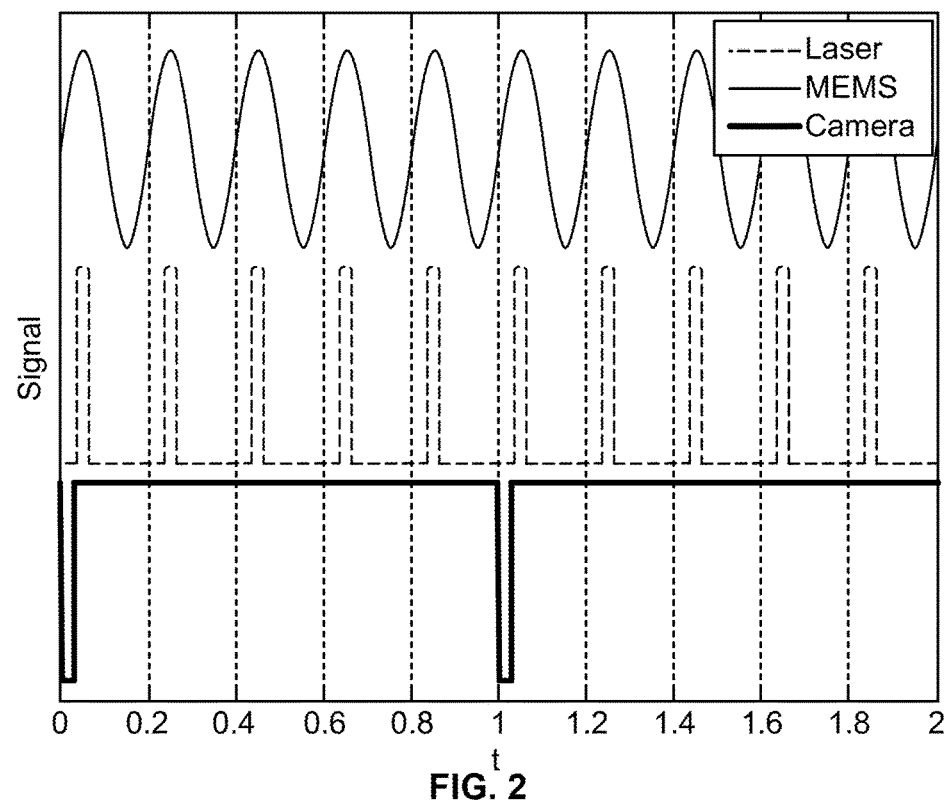
FIG. 2 illustrates the different signals used in spectroscopy. In this example of spectroscopy, the camera is set to capture images at 1 Hz and the MEMS sample is vibrating harmonically at 5 Hz. The laser illuminates the sample at the same frequency as its vibration but only for a very short time during every oscillation.
Figure 3:
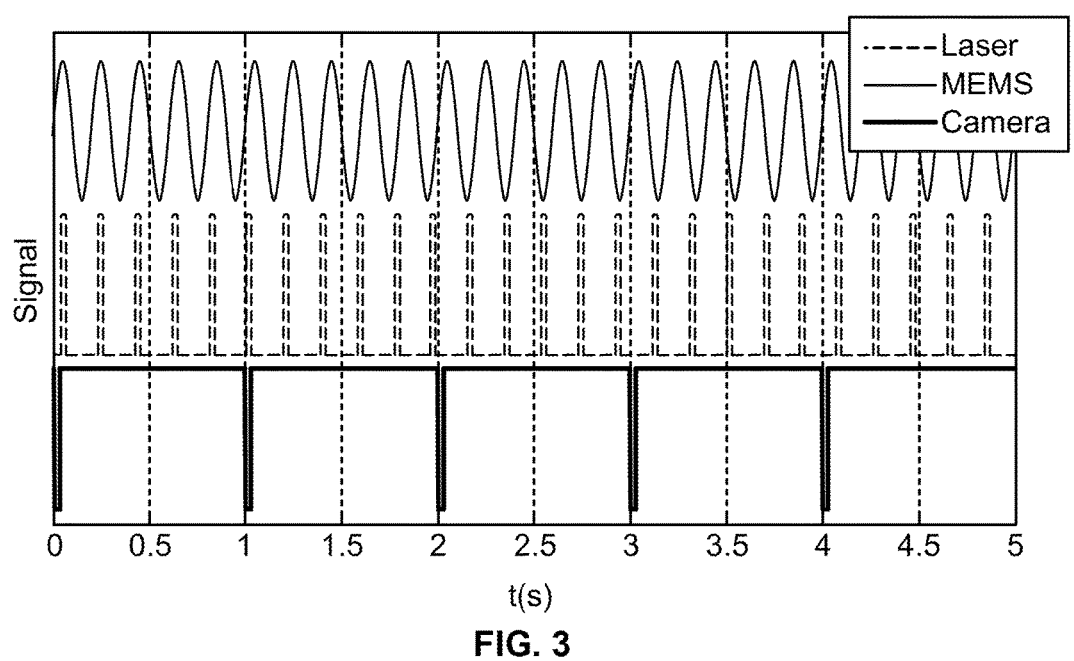
FIG. 3 illustrates that in case of hardware limitations when it comes to continuous phase control, relative frequency difference can be used to create phase difference in consecutive frames.

In another embodiment, the present invention combines spectroscopy with interferometry. This mode does not require a high speed camera but it requires the ability to modulate the light source at a speed greater than the target frequency. In a preferred embodiment, the speed is at least 50 times faster than the maximum target frequency. The different signals used to trigger the camera, vibrate the sample (a MEMS as an exemplar) and modulate the light source intensity are illustrated in FIG. 2. Since light illuminates the sample only for a fraction of its oscillation period, in spectroscopy, the shutter is open for longer periods of time to receive enough light for capturing every single frame. For this particular embodiment of the present invention, the laser diode used may be modulated up to 150 MHz enabling the microscope to capture the 3-D harmonic vibrations of up to 3 MHz.

In order to not only see the deformed shape but to capture the complete vibration profile or mode shape of a vibrating sample, such as a harmonically vibrating sample, using the dynamic operation mode, the phase of the light needs to be changed as shown in FIG. 2. In a preferred embodiment, the invention is configured to use a one-to-one frame capture and to use every new frame captured to cover the complete $[0-2\pi]$ range. Most function generators commercially available are not capable of changing phase of the signal, without stopping the wave-train momentarily (at the order of 10 ms). A random phase lag happens between the laser intensity and its modulating signal every time that the modulation signal resets (or pauses momentarily), making phase control practically impossible.

In order to overcome this hardware limitation, in certain embodiments, the present invention increases frequency of the light, from its original value being equal to the frequency of the sample, with a fraction of the frequency of the camera. This increase should be considerably small or it can result in blurry fringes. It was found that increasing the frequency of the light with a value equal to 0.5%-5% of the camera frequency is practical and does not result in blurry fringes. For example, in order to capture the complete vibration profile of a MEMS device vibrating at 1 MHz, using spectroscopy and a camera that captures one frame per second, the frequency of the laser may be set to 1000000.001 Hz. This offsets the phase of every frame $2\pi/1000$ with respect to the 1000 previous frame, requiring a total of 1000 frames to capture the complete vibration profile. FIG. 2 illustrates this concept at a much lower frequency and number of frames.

In order to control the actuation of a sample, such as a MEMS or photonic crystals, modulate the laser source and trigger the camera as well as synchronizing any workstations needed to operate the microscope, three electrical signals in form of voltage sources may be required. These signals may be generated using function generators obtained from Agilent Technologies, controlled by the software developed in LabVIEW.

The signal required to control the laser diode is a voltage source and it specifies the current passing through the laser diode. The camera-trigger-signal is used to trigger the camera and at the same time synchronize the sample (MEMS) actuation and the image acquisition controlled which may be done by the use of two separate computers.

The image acquisition and post-processing may be performed using MATLAB. The software should be designed to capture micrographs obtained using a CCD camera (XCD 910UV) and does all the numerical analysis required to generate a live 3D image of the vibrational modes of the sample and save it as a video file. The software package should provide a user full control over all of the camera settings such as: Shutter mode; Shutter timing; Exposure; Brightness; Gain; Image resolution; Trigger source; Trigger repeat; Data Logging; Noise reduction; Tip-tilt correction; 2D/3D imaging; Preview mode; Live data saving; and Live continuous mode.

For every frame captured an automatic FFT analysis is used to remove the high frequency noise and diffraction effects. The 8 bit image data are in intensity form, ranging from 0 to 255. Theoretically a constructive interference should yield a white pixel with intensity of 255 and a destructive interference should yield a black pixel of 0 intensity. In reality, peaks can vary in intensity anywhere from 230 to 255 and valleys can vary from 0 to 20. In order to prevent any saturation, it is recommended to adjust the shutter timing such that the minimum intensity is always higher than 0 and the maximum intensity is lower than 255. The maximum and minimum value of intensity may be displayed in a live preview window to facilitate this. The MATLAB code may also be used to calculate the wrapped phase values for every interferogram, unwrap, and find the 3D shape of the device and create a movie of the complete vibration profile automatically.

The camera trigger signal is the bridge between the two computers. MATLAB code detects the triggering signal sent by LabVIEW to the camera and acts accordingly. The transfer of data from camera to MATLAB is done on every frame to facilitate live image acquisition and image processing. If required, it is also possible to average a couple of frames to require one super high quality image for static mode.

The coherent light beams used for interferometry are electromagnetic waves which can be represented as (4.1). It is the phase difference between the two waves, rather than the absolute phase values of each wave that is deterministic in fringe formation. This means that the phase of one of the beams can be considered to be zero and the phase difference be due to the second beam only. This is done only for simplification purpose and does not affect the nature of equations neither the final results.

$$E_1(x,y,t)=E_1^0(x,y)e^{i\omega t}$$

$$E_2(x,y,t)=E_2^0(x,y)e^{i(\omega t+\Phi(x,y))} \quad (4.1)$$

In this set of equations $e_i$ shows the amplitudes of the electromagnetic waves, $\omega$ is equal to $2\pi$ multiplied by the frequency of the light, which is 564 THz for the green light used here and $\Phi(x, y)$ is the total phase at different locations in the image. The interference wave equation is obtained by addition of the waves as in (4.2):

$$E(x,y,t)=E_1^0(x,y)e^{i\omega t}+E_2^0(x,y)e^{i(\omega t+\Phi(x,y))} \quad (4.2)$$

Since a CCD camera does not record the wave equation, the information may be obtained from the camera in the form of images which show the intensity (power multiplied by detector cross sectional area) at every point. Power of an electromagnetic wave is obtained as (4.3) where $E^*(x,y,t)$ is the complex conjugate of $E(x,y,t)$ and $\tau$ represents the duration of one period.

$$P(x, y, t) = \int_0^\tau \frac{E(x, y, t)E^*(x, y, t)}{\tau} dt \quad (4.3)$$

Every interferogram can be considered as a superposition of the background image of the sample (2-D image of a sample under microscope) and the fringe patterns which adds the of the third dimension to the image. There are multiple methods to analyze the fringe patterns of interferograms. The most natural method is fringe tracking which is basically finding the constructive and destructive interference extremes and taking into account that every two consecutive constructive interferences correspond to an out of plane height difference of $\pi/2$, but this method is very vulnerable to noise and other effects such as inconsistencies in reflectivity of the samples at different points. The Fourier method is a more robust method for fringe analysis. This method is computationally more expensive but yields in useful phase information even in relatively low fringe contrast situations or considerably noisy images.

Fourier Transform Analysis provides a robust method to find the phase compared to the fringe tracing method. The Fourier method is robust to noise caused by unwanted vibrations or diffractions from debris, reduced contrast due to unwanted vibrations and reflectivity inconsistencies along sample. It also enables one to separate the background image from the superimposed fringe patterns. But it is much more demanding when it comes to computational cost and needs the fringes to have certain characteristics to be effective.

Fourier methods are used to analyze the image in phase space rather than length space. Usually the fringes correspond to higher frequencies, in the phase space, compared to the background image and can be separated from the background information which correspond to the 2D image of the sample. The higher the number of fringes the higher the frequency they correspond to. Since there is no clear boundary between the frequencies corresponding to the fringes and the frequencies corresponding to the background data, it may be desirable to increase the number of fringes on the sample by tilting the reference mirror. Increasing the number of fringes further separates the poles in the frequency domain, making it easier to distinguish the fringe information from the background and reducing the error associated with removing the low frequency background data.

Using (4.1)-(4.3) the intensity of the light at every pixel of the CCD can be written as a function of the intensity of the light reflected from the sample, $g_1(x,y)$, and the reference mirror, $g_2(x,y)$, as (4.4)

$$g(x,y)=g_1(x,y)+g_2(x,y)+\sqrt{2g_1(x,y)g_2(x,y)}\cos(\Phi(x,y)) \quad (4.4)$$

The phase difference between the two incident beams, t (x, y), is equal to:

$$\Phi(x,y)=\varphi_0(x,y)-2^*\pi F \cdot R \quad (4.5)$$

where $\varphi_0(x, y)$ is the initial phase difference between the sample and the mirror beams, F is the frequency vector and R is the coordinate vector in the plane of image.

Equation (4.4) can be rewritten in the mode compact form of (4.6):

$$g(x,y)=a(x,y)+b(x,y)\cos(\Phi(x,y)) \quad (4.6)$$

Substituting for $\Phi(x,y)$ from (4.5) and using trigonometric to exponential expansion, the intensity of the light received by the camera (4.4) can be written in the general form of (4.7):

$$g(x,y)=a(x,y)+c(x,y)e^{2\pi i F \cdot R}+c(x,y)^*e^{-2\pi i F \cdot R} \quad (4.7)$$

in which $$c(x, y) = \frac{1}{2}b(x, y)e^{i\phi_0(x,y)} \quad (4.8)$$

When plotting the FFT of an image, it is common to plot the logarithm of the power of the FFT which in turn is equal to the FFT value at every pixel multiplied by its conjugate value divided by the number of pixels.

If the tip-tilt angle of the reference mirror is increase enough to produce a considerable number of fringes, there will be at least three distinct poles in the FFT of the interferogram. In order to have these poles separated from each other, a considerable number of fringes is needed to start with. The central pole located at point F=(0,0) in frequency domain and the region around it corresponds to the background information. The other two poles are complex conjugates and are the result of fringes. Each of the offset poles carry enough information to reconstruct the fringes, making the other one redundant.

Equation (4.7) shows the Fourier transform of (4.7). In this equation A $(F_x,Fy)$, C $(F_x,F_y)$ and $C^*(F_x,F_y)$ are the Fourier transforms of a (x,y), c (x,y) and c (x,y)*.

$$G(F_x,F_y)=A(F_x,F_y)+C(F_x-F_{0x},F_y-F_{0y})+C^*(F_x+F_{0x}, F_y+F_{0y}) \quad (4.9)$$

As explained, $A(F_x,F_y)$ includes the information about the background image (with no fringes) and the two complex conjugate poles of C $(F_x-F_{0x}, F_y-F_{0y})$ and $C^*(F_x+F_{0x}, F_y+F_{0y})$ have the information about the fringes superimposed on the background image. The goal in phase analysis using the Fourier transform method is to remove the effects of the light coming from the sample and the mirror and find the phase difference between the two beams of light at every pixel of the image. This is accomplished by filtering the central pole in the FFT and transferring one of the conjugate poles, C $(F_x-F_{0x},F_y-F_{0y})$ for example, to the center in order to eliminate the offset and obtain $C(F_x, Fy)$. Once $C(F_x, Fy)$ is found an inverse Fourier transform is used to obtain c(x,y), which based on (4.8) can be used to calculate the phase, as the imaginary component of (4.10).

$$\log[c(x,y)] = \log[\tfrac{1}{2}b(x,y)] + i\Phi(x,y) \quad (4.10)$$

A Fourier method may be used to filter background information and then obtain phase.

Whether using fringe tracing or Fourier method for phase analysis, the final result is limited to $[-\pi,\pi]$. Every $2\pi$ phase difference corresponds to $\lambda/2$ height difference on the sample. This means that if the out of plane deformation/dimension of the sample is greater than $\lambda/2$, its phase will be modulated into this range by breaking it into slices of $\lambda/2$ and consequently $2\pi$. A process known as phase unwrapping is required to stick the modulated phase information after Fourier analysis The methods of the present invention provide robust and efficient methods for three-dimensional phase unwrapping.

Changing the initial phase, before the inverse Fourier transform of $C(F_x,F_y)$ to obtain c(x,y) values required for (4.10), can actually simulate the motion of fringe on the sample as happens when the reference mirror or the sample are moved, in PSI and VSI methods respectively.

The phase unwrapping method of the certain embodiments of the present invention starts with two sets of wrapped phase matrixes, one with an initial phase of zero ($\varphi_0(x,y)=0$) and the other one with $\varphi_0(x,y)=\pi$. Each of the two phase sets are in the form of strips in $[-\pi,\pi]$ range with discontinuities at both extremes. Using the two sets of phase matrixes corresponding to the same interferogram means where one strip reaches the $\pi$ or $\pi$ extremes the other one is continuous with its value is near the median value of zero. This enables full unwrapping of the phase by using the other set when one set is not continuous. Switching between the two sets the phase can be unwrapped as a continuous stream of data.

A consideration when performing interferometry is that the interferometry might fail to correctly specify the height difference between two points if they cannot be connected by a continuous 3-D curve (or polygon with some limitations). This is because interferometry cannot tell apart between phase differences of $\theta$ and $2n\pi+\theta$ between two points, unless there is a continuous 3-D path, with jumps smaller than $\lambda/2$, connecting them. There is a one-to-one correlation between the wrapped and unwrapped phase if the surface is continuous without any tears and jump in out of plane direction and the problem is mathematically solvable as done in here. But any tears larger than $\lambda/2$ makes the unwrapping mathematically impossible to solve.

Another method that is also equally successfully used here is to identify the physical tears in the sample. Then separate each continuous area of the phase which are shaped like stiped going from $-\pi$ to $\pi$. Finally start stitching the different phase surfaces to each other by applying the required $2n\pi$ shift. The latter should start from the largest surfaces and proceed to smaller ones. At the end convert phase information height information and report the 3D representation.

After selecting a continuous region of the sample and unwrapping the phase in the region, all that is required to find the out of plane height value for each pixel is to consider that every $2\pi$ phase difference corresponds to $\lambda/2$ height difference in out of plane direction.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiments, methods, and examples, but by all embodiments and methods within the scope and spirit of the disclosure.

What is claimed is:

1. A method of using a Michelson interferometer having a CCD camera to capture images of a vibrating sample comprising the steps of: providing a coherent light source, said coherent light source adapted to illuminate the vibrating sample with a coherent light and using the CCD camera to create a 3D representation of the vibrating sample by generating a single frame for a predetermined phase of the vibrating sample.

2. The method of claim 1 wherein said 3D representation is combined with at least one other 3D representation to create a 3D video representation of the vibrating sample.

3. The method of claim 1 wherein said coherent light is strobed at a frequency matching the vibration of the vibrating sample to allow the CCD camera to capture the shape of the vibrating sample at a predetermined phase in the vibration of the vibrating sample.

4. The method of claim 3 wherein a monotonically increasing phase shift is used between the strobing light and the vibrating sample to capture different phases of the vibration of the vibrating sample.

5. The method of claim 1 wherein the CCD camera is configured to use a one-to-one frame capture and a plurality of different frames from said one-to-one frame capture are used to cover the complete range of vibration of the vibrating sample.

6. The method of claim 5 further including the step of strobing said coherent light at a frequency greater than the harmonic frequency of the sample, and obtaining a plurality of frames at increasing phases of the sample.

7. The method of claim 5 wherein said coherent light is strobed at a frequency that is greater vibration of the vibrating sample.

* * * * *